(12) United States Patent
Chujoh et al.

(10) Patent No.: US 9,788,025 B2
(45) Date of Patent: Oct. 10, 2017

(54) REPRODUCTION DEVICE, ENCODING DEVICE, AND REPRODUCTION METHOD

(71) Applicant: Kabushiki Kaisha Toshiba, Minato-ku (JP)

(72) Inventors: Takeshi Chujoh, Kawasaki (JP); Shunichi Gondo, Ohta (JP); Akiyuki Tanizawa, Kawasaki (JP); Tomoya Kodama, Kawasaki (JP); Takayuki Itoh, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/872,542

(22) Filed: Oct. 1, 2015

(65) Prior Publication Data

US 2016/0100216 A1    Apr. 7, 2016

(30) Foreign Application Priority Data

Oct. 3, 2014   (JP) ................................ 2014-204428

(51) Int. Cl.
*H04N 7/173*   (2011.01)
*G06T 17/00*   (2006.01)
(Continued)

(52) U.S. Cl.
CPC ............. *H04N 21/234327* (2013.01); *H04N 21/234345* (2013.01); *H04N 21/234363* (2013.01); *H04N 21/845* (2013.01); *G06T 2207/20016* (2013.01); *G06T 2207/20021* (2013.01); *H04N 21/23412* (2013.01)

(58) Field of Classification Search
CPC ...... H04N 21/23412; H04N 21/234327; G06T 2207/20016; G06T 2207/20021
See application file for complete search history.

(56) References Cited

U.S. PATENT DOCUMENTS 5,757,969 A  *  5/1998  Kim ...................... H04N 19/86
                                                         375/E7.19
2007/0216677 A1 *  9/2007  Fuchie .................... G06T 15/40
                                                         345/420
(Continued)

FOREIGN PATENT DOCUMENTS

WO    WO 2011/053658 A1    5/2011

*Primary Examiner* — James R Marandi
(74) *Attorney, Agent, or Firm* — Oblon, McClelland, Maier & Neustadt, L.L.P.

(57) ABSTRACT

According to an embodiment, a reproduction device includes an acquirer, a decoder, and a synthesizer. The acquirer is configured to acquire transmission information including first and second coded data. The first and second coded data are generated by encoding first and second image data, respectively. At least one of the first and the second image data is lossy encoded. The first and second image data being generated by performing conversion processes different from each other on original image data. The decoder is configured to decode the first and second coded data to generate first and second decoded data. The synthesizer is configured to synthesize the first and the second decoded data with adjusting pixel positions of the first and the second decoded data so that the pixel positions of the first and the second decoded data are identical to each other to generate reproduction image data.

7 Claims, 10 Drawing Sheets

(51) Int. Cl.
*G09G 5/00* (2006.01)
*G06K 9/54* (2006.01)
*H04N 21/2343* (2011.01)
*H04N 21/845* (2011.01)
*H04N 21/234* (2011.01)

(56) References Cited

U.S. PATENT DOCUMENTS

| | | | |
|---|---|---|---|
| 2010/0277613 A1* | 11/2010 | Seki | G11B 20/1262 348/231.2 |
| 2015/0054854 A1* | 2/2015 | Lee | G09G 5/373 345/661 |
| 2015/0078436 A1 | 3/2015 | Chujoh et al. | |

* cited by examiner

REPRODUCTION DEVICE, ENCODING DEVICE, AND REPRODUCTION METHOD

CROSS-REFERENCE TO RELATED APPLICATION

This application is based upon and claims the benefit of priority from Japanese Patent Application No. 2014-204428, filed on Oct. 3, 2014; the entire contents of which are incorporated herein by reference.

FIELD

Embodiments described herein relate generally to a reproduction device, an encoding device, and a reproduction method.

BACKGROUND

Adaptive streaming of dividing coded data into segment files and switching and distributing a file to be downloaded in accordance with a transmission state, a line speed, and the like, has been known.

Conventionally, files with different encoding distortions are continuously reproduced, thereby deteriorating image quality of the reproduced image.

DETAILED DESCRIPTION

According to an embodiment, a reproduction device includes an acquirer, a decoder, and a synthesizer. The acquirer is configured to acquire transmission information including first and second coded data. The first and second coded data are generated by encoding first and second image data, respectively. At least one of the first and the second image data is lossy encoded. The first and second image data being generated by performing conversion processes different from each other on original image data. The decoder is configured to decode the first and second coded data to generate first and second decoded data. The synthesizer is configured to synthesize the first and the second decoded data with adjusting pixel positions of the first and the second decoded data so that the pixel positions of the first and the second decoded data are identical to each other to generate reproduction image data.

First Embodiment

Encoding Device

Figure 1:
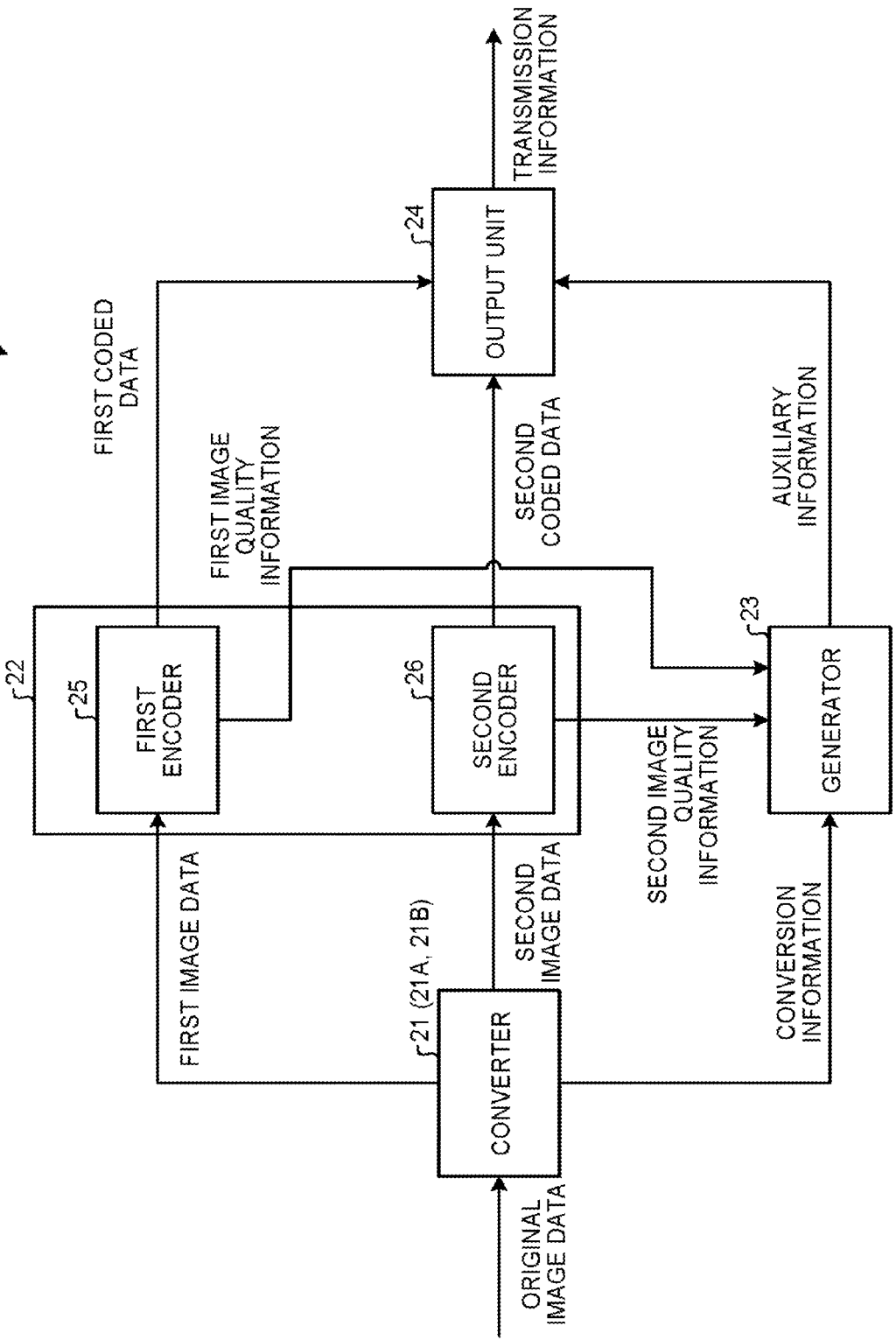
FIG. 1 is a block diagram of an encoding device according to some embodiments.

FIG. 1 is a block diagram illustrating the functional configuration of an encoding device 20 according to some embodiments.

The encoding device 20 encodes original image data. The original image data is moving image data.

The encoding device 20 includes a converter 21, an encoder 22, a generator 23, and an output unit 24. Some or all of the converter 21, the encoder 22, the generator 23, and the output unit 24 may be made to function by causing a processing device such as a central processing unit (CPU) to execute programs, that is, by software, by hardware such as an integrated circuit (IC), or by software and hardware in combination, for example.

The converter 21 performs conversion processes different from each other on the original image data to convert the original image data into first image data and second image data. That is to say, the first image data and the second image data are pieces of data provided by performing the different conversion processes on the original image data. It should be noted that one of the first image data and the second image data may be the original image data. The converter 21 may generate two types of pieces of input image data (the first image data, the second image data) by performing the different conversion processes on the original image data.

The converter 21 outputs conversion information on the conversion processes performed on the original image data to the generator 23.

Each conversion process may be a well-known invertible conversion process and may be a well-known lossy conversion process. The lossy conversion process includes a conversion process with which data is not completely restored by conversion and inverse conversion.

The conversion process is at least one of cropping, reduction, enlargement, rotation, inversion, pixel movement, and pixel value conversion, for example.

The cropping is the process of removing unwanted parts of the original image data to create a focused (wanted) image area. Specifically, the cropping is the process of taking a part of each frame of the original image data. The rotation is the process of rotating an image of each frame of the original image data in a certain direction (for example, clockwise, counterclockwise) by a certain angle. The inversion is the process of inverting an image of each frame of the original image data. The pixel movement is the process of shifting pixel positions of pixels of each frame of the original image data in the right-left direction or the up-down direction by M pixels (M is an integer).

The pixel value conversion is color conversion (for example, color conversion of converting a color space of an RGB system to a color space of a CMYK system), gamma conversion, Wavelet conversion, color space conversion of converting BT.2020 to BT.709, conversion process of degenerating a pixel bit length to 8 bits from 10 bits, or the like.

Signals that are conversion processing targets on the original image data may be all of a luminance signal Y and color difference signals Cb and Cr or the color difference signals Cb and Cr alone. A color format of the original image data is not limited but may be any of RGB, YUV, and the like.

In the following, the cropping is described as an example of the conversion process performed by the converter 21.

Figure 2:
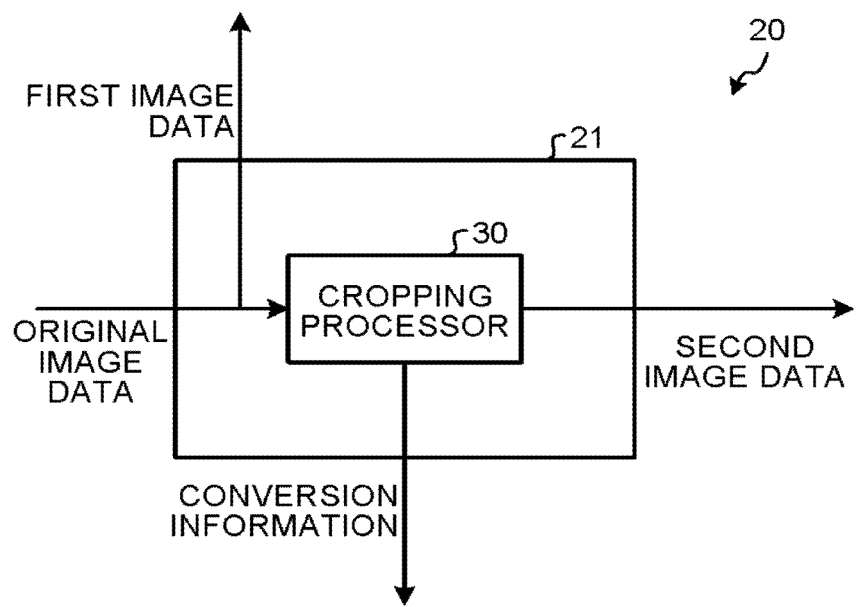
FIG. 2 is a block diagram of a converter.

FIG. 2 is a block diagram of the converter 21 in the encoding device 20. In an example as illustrated in FIG. 2, the converter 21 includes a cropping processor 30. In the embodiment, the converter 21 outputs the original image data as the first image data to the encoder 22. The cropping processor 30 of the converter 21 performs the process of taking a part of each frame from the original image data and outputs a wanted image data corresponding to the part as the second image data to the encoder 22. The cropping processor 30 outputs, as conversion information, information on cropping conditions at the time of the cropping to the generator 23. The cropping conditions include a start position and a size of a wanted area (hereinafter, referred to as segment) on each frame of the original image data.

Figure 3:
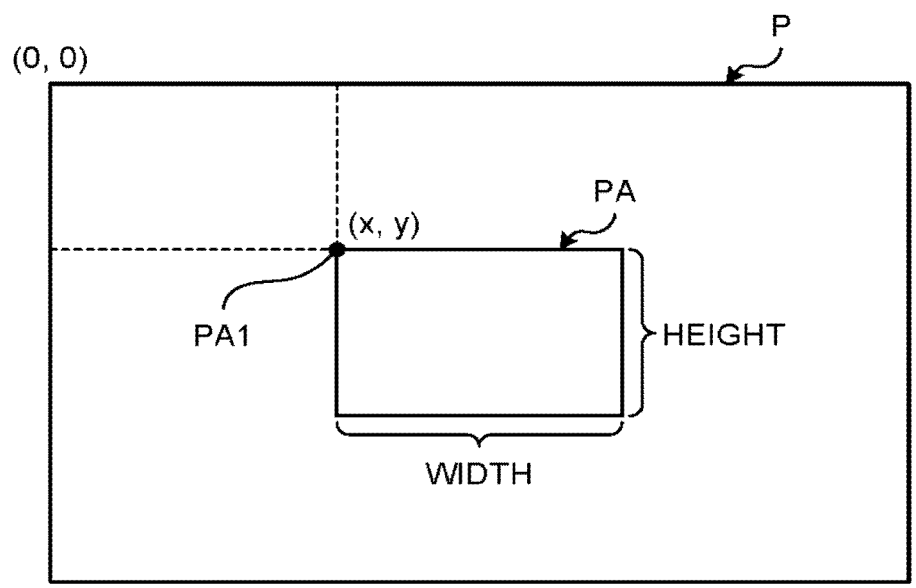
FIG. 3 is a descriptive view for explaining cropping.

FIG. 3 is a descriptive view for explaining the cropping by the cropping processor 30. An outer rectangle in FIG. 3 illustrates each frame P of the original image data and has a coordinate system in which an upper left vertex in FIG. 3 is a point of origin (0, 0). The cropping processor 30 takes a segment PA (in FIG. 3, the area defined by width and height) having a certain size in which a segment position PA1 indicated by coordinates (x, y) is a start position in each frame P of the original image data. Then, the cropping processor 30 outputs, as the second image data, image data including the segment PA taken for each frame of the original image data to the encoder 22.

With reference back to FIG. 2, the converter 21 outputs the second image data taken from the original image data by the cropping processor 30 to the encoder 22. The converter 21 outputs the original image data as the first image data to the encoder 22. Furthermore, the converter 21 outputs the conversion information to the generator 23. In the embodiment, the conversion information includes the segment position (x, y) on each frame and the size of the segment. There may be some embodiments where the information on the size of the segment is included in system information of the second image data and the conversion information does not include the information on the size of the segment.

In general image encoding systems such as JPEG, MPEG-2, MPEG-4, H.264/AVC, and H.265/HEVC, the encoding process is performed in units of a block of power-of-two such as 16×16 pixels. Furthermore, the conversion process is also performed in units of a block of power-of-two such as 4×4 pixels or 8×8 pixels in the same manner, and encoding distortion therefore tends to be generated in the same units.

The cropping processor 30 of the converter 21 preferably takes the area with the segment position (x, y) of the second image data on the original image data shifted from the block units. The process allows the encoding distortion to be canceled on the side of a reproduction device, which will be described later.

Specifically, it is assumed that a color difference format of the original image data is a 4:2:0 format. In this case, the two color difference signals Cb and Cr have pixels the number of which is only half that of the luminance signal Y in both the vertical and horizontal directions. Thus, it is sufficient that the cropping processor 30 sets values of x and y of the segment position (x, y) from the original image data to 4N+2 (N is an integer equal to or greater than 0), for example.

It is assumed that the color difference format of the original image data is a 4:2:2 format. In this case, the two color difference signals Cb and Cr have pixels the number of which is half that of the luminance signal Y in the horizontal direction. Thus, it is sufficient that the cropping processor 30 sets a value of x of the segment position (x, y) to 4N+2 (N is an integer equal to or greater than 0) and a value of y to 2N+1 (N is an integer equal to or greater than 0), for example.

It is assumed that the color difference format of the original image data is a 4:4:4 format. In this case, the two color difference signals Cb and Cr have pixels the number of which is the same as that of the luminance signal. Thus, it is sufficient that the cropping processor 30 sets values of x and y of the segment position (x, y) to 2N+1 (N is an integer equal to or greater than 0).

In the embodiment, the converter 21 outputs the original image data as the first image data to the encoder 22 and outputs, as the second image data, the image data taken by the cropping on the original image data to the encoder 22. Not limited to this, it is, however, sufficient that the converter 21 performs the conversion processes different from each other on the original image data to convert the original image data into the first image data and the second image data. In other words, without being limited to the embodiment where the original image data is output as the first image data, the converter 21 may perform a conversion process, which is different from that for the second image data, on the original image data to obtain the first image data.

With reference back to FIG. 1, the encoder 22 receives the first image data from the converter 21. The encoder 22 further receives the second image data from the converter 21. The encoder 22 performs encoding the first image data and the second image data to generate first coded data and second coded data but at least one of encoding for the first image data and encoding for the second image data is lossy encoding.

In the embodiment, the encoder 22 includes a first encoder 25 and a second encoder 26. The first encoder 25 and the second encoder 26 may perform encoding using the same encoding system or may perform encoding using different encoding systems. Note that at least one of the first encoder 25 and the second encoder 26 performs lossy encoding.

The encoding system(s) that is(are) employed by the first encoder 25 and the second encoder 26 is(are) well-known encoding system(s) and is(are) not limited thereto. For example, the encoding system that is employed by the encoder 22 (the first encoder 25, the second encoder 26) is an encoding system such as JPEG, MPEG-2, MPEG-4, H.264/AVC, and H.265/HEVC.

The case using different encoding systems includes the case under different encoding conditions. For example, the encoder 22 may generate the pieces of coded data (the first coded data, the second coded data) under different encoding conditions by changing parameters that are described in the pieces of coded data.

For example, encoding frame rates of the first coded data and the second coded data may be different.

A moving image encoding system employs an encoding structure in which an intra-frame is inserted temporally and periodically in order to achieve random accessibility. Accordingly, the encoder 22 may generate the first coded data and the second coded data with different encoding systems by changing a position and a cycle at which the intra-frame is inserted.

In the moving image encoding system, a bi-directional predicted frame capable of being predicted based on both of the past and the future temporally is used in some cases. Accordingly, the encoder 22 may generate the first coded data and the second coded data with different encoding systems by making the number of bi-directional predicted frames and temporal positions of the bi-directional predicted frames different.

In an encoding system capable of employing a prediction structure between reference images more flexibly, such as H.264/AVC and H.265/HEVC, encoding efficiency can be improved by weighting of reference and non-reference coded images called a hierarchical B structure and a hierarchical P structure and a quantization parameter. Accordingly, the encoder 22 may generate the first coded data and the second coded data with different encoding systems by using different hierarchical structures or causing temporal hierarchical structures and cycles to be different.

It should be noted that the encoder 22 may not use only one encoding system but use a plurality of encoding systems in combination.

The first encoder 25 encodes the first image data received from the converter 21 to generate the first coded data. The first encoder 25 outputs first image quality information that is used in decoding of the first coded data to the generator 23. The first image quality information includes a locally decoded image generated in encoding by the first encoder 25 and standard deviation information of the first image data, for example.

The second encoder 26 encodes the second image data received from the converter 21 to generate the second coded data. The second encoder 26 outputs second image quality information that is used in decoding of the second coded data to the generator 23. The second image quality information includes a locally decoded image generated in encoding by the second encoder 26 and standard deviation information of the second image data, for example.

In the embodiment, the converter 21 outputs two types of pieces of input image data (the first image data, the second image data) by performing the conversion processes different from each other on the original image data.

Alternatively, the converter 21 may output pieces of input image data of equal to or more than three types to the encoder 22 by performing the conversion processes different from each other on the original image data.

In this case, it is sufficient that the encoder 22 includes encoders the number of which corresponds to the number of types of the pieces of input image data received.

For example, when the encoder 22 receives three types of pieces of input image data from the converter 21, it is sufficient that the encoder 22 includes three encoders (the first encoder 25, the second encoder 26, and a third encoder (not illustrated)).

The generator 23 receives the conversion information from the converter 21. The generator 23 further receives the first image quality information from the first encoder 25. In addition, the generator 23 receives the second image quality information from the second encoder 26.

The generator 23 generates auxiliary information and outputs it to the output unit 24. The auxiliary information is information that is used when a reproduction device, which will be described later, generates reproduction image data. In the embodiment, the auxiliary information includes the conversion information and synthesis information.

It is sufficient that the auxiliary information is information including at least the conversion information and the auxiliary information does not necessarily need to include the synthesis information. That is to say, when the reproduction device, which will be described later, can acquire or calculate the synthesis information based on the pieces of coded data (the first coded data, the second coded data) and the like, the auxiliary information does not necessarily need to include the synthesis information.

The synthesis information is information necessary when the reproduction device, which will be described later, synthesizes first decoded data and second decoded data. Although details will be described later, the synthesis that is performed by the reproduction device is the process of converting and synthesizing the first decoded data and the second decoded data such that pixel positions thereof are identical to each other.

Specifically, the synthesis information includes a weighting coefficient, a quantization parameter that is used for calculating the weighting coefficient, or the like.

The weighting coefficient is used when the first decoded data and the second decoded data are synthesized. Specifically, the weighting coefficient is a weighting coefficient that is given to pixel values of respective pixels when pixel values of respective pixels in the first decoded data and pixel values of respective pixels at respective corresponding pixel positions in the second decoded data are synthesized.

The generator 23 calculates a weighting coefficient W using Equation (1) to Equation (4), for example.

$$d(x,y) = w d_1(x,y) + (1-w) d_2(x,y) \tag{1}$$

$$w = \frac{\sigma_1^{-2}}{\sigma_1^{-2} + \sigma_2^{-2}} \tag{2}$$

$$\sigma_1^{-2} = \left( \frac{\sum_{j=0}^{h-1} \sum_{i=0}^{w-1} (d_1(i,j) - d_{org_1}(i,j))^2}{hw} \right)^{-1} \tag{3}$$

$$\sigma_2^{-2} = \left( \frac{\sum_{j=0}^{h-1} \sum_{i=0}^{w-1} (d_2(i,j) - d_{org_2}(i,j))^2}{hw} \right)^{-1} \tag{4}$$

In Equation (1) to Equation (4), $d_1$ is the locally decoded signal generated in the encoding by the first encoder 25, $d_{org_1}$ is the first image data, $\sigma_1$ is the first image quality information generated by the first encoder 25 and indicates standard deviation of the encoding distortion of the first coded data, $d_2$ is the locally decoded signal generated in the encoding by the second encoder 26, $d_{org_2}$ is second image data, and $\sigma_2$ is the second image quality information generated by the second encoder 26 and indicates standard deviation of the encoding distortion of the second coded data.

In Equation (1) to Equation (4), d(x, y) indicates a reproduction image signal as a weighted average value. A first argument indicates a pixel position in the horizontal direction and a second argument indicates a pixel position in the perpendicular direction. Here, w indicates an image size in the horizontal direction and h indicates an image size in the perpendicular direction.

As indicated by Equation (2), the generator 23 calculates the weighting coefficient W by a ratio of the inverse of the squares of the two standard deviations, that is, dispersion ($\sigma_1^2$, $\sigma_2^2$). The calculation is made in order to try to reduce errors by assuming that the encoding distortions as the errors of the pieces of coded data (the first coded data, the second coded data) provided by image conversion and encoding of the original image data are Gaussian distributions, and normalizing and averaging the error distributions of the first decoded data and the second decoded data that are provided by decoding the pieces of coded data by respective dispersions thereof.

As described above, when the encoder 22 receives the pieces of input image data of equal to or more than three types and the encoder 22 includes equal to or more than three encoders (the first encoder 25, the second encoder 26, an $i^{th}$ encoder (i is an integer)), the generator 23 calculates the weighting coefficient W and the weighted average value d using Equation (5) and Equation (6).

$$d(x, y) = \sum_{i=1}^{n} w_i d_i(x, y) \quad (5)$$

$$w_i = \frac{\sigma_i^{-2}}{\sum_{j=1}^{n} \sigma_j^{-2}} \quad (6)$$

In Equation (5) and Equation (6), d(x, y) indicates the reproduction image signal as the weighted average value, $d_i$ is a locally decoded signal generated by the $i^{th}$ encoder included in the encoder 22, i is an integer of equal to or higher than 1, and $\sigma_i$ indicates standard deviation of decoded data provided by decoding coded data generated by the $i^{th}$ encoder and the original image data.

The generator 23 may calculate the weighting coefficient W by another method.

It is known that the quantization parameter and a distortion rate (PSNR) have a relation of proportion in design of a quantizer such as H.264/AVC and H.265/HEVC. In this case, the standard deviation of the original image data and the decoded data is not required to be calculated.

Based on this knowledge, when the encoding system by the encoder 22 is H.264/AVC or H.265/HEVC, the generator 23 calculates the weighting coefficient W using Equation (7) and Equation (8).

$$d(x, y) = \sum_{i=1}^{n} w_i d_i(x, y) \quad (7)$$

$$w_i = \frac{2^{-\alpha QP_i}}{\sum_{j=1}^{n} 2^{-\alpha QP_j}} \quad (8)$$

In Equation (7) and Equation (8), $QP_i$ indicates a quantization parameter of the $i^{th}$ encoder, $w_i$ is a weighting coefficient, and α is a variable depending on the original image data.

In this case, it is sufficient that the generator 23 generates the weighting coefficient and the variable α as the synthesis information. The quantization parameter $QP_1$ is information included in the coded data and is not therefore required to be included in the synthesis information. Furthermore, when the quantization parameter $QP_1$ is the same among the plurality of encoders (the first encoder 25, the second encoder 26, the $i^{th}$ encoder), the weighting coefficient is the same and is not therefore required to be included in the synthesis information.

It should be noted that the reproduction device, which will be described later, may calculate the weighting coefficient W. In this case, for example, the reproduction device may calculate the weighting coefficient using Equation (7) and Equation (8) and the like.

The output unit 24 receives the first coded data and the second coded data from the encoder 22. The output unit 24 receives the auxiliary information from the generator 23.

The output unit 24 outputs transmission information to the reproduction device. The transmission information includes at least the first coded data and the second coded data. When the encoder 22 includes equal to or more than three encoders as described above, the output unit 24 receives equal to or more than three pieces of coded data. In this case, the encoder 22 outputs transmission information including at least the equal to or more than three pieces of coded data.

The transmission information may further include the auxiliary information.

Figure 4:
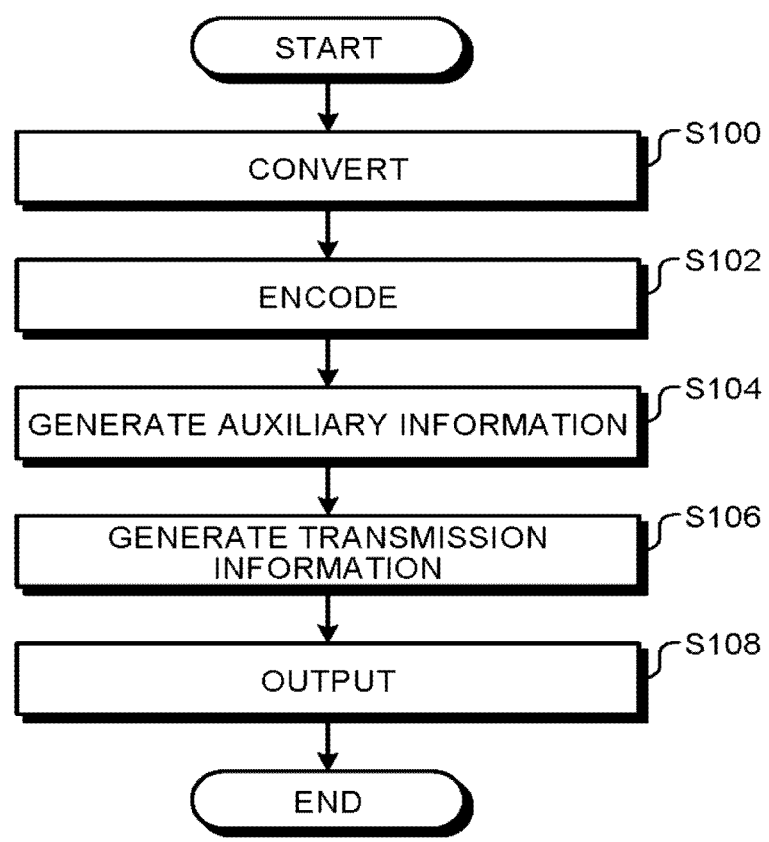
FIG. 4 is a flowchart illustrating procedures of encoding process.

FIG. 4 is a flowchart illustrating procedures of encoding process that is executed by the encoding device 20.

First, the converter 21 performs the conversion processes different from each other on the original image data to convert the original image data into the first image data and the second image data (step S100). Then, the encoder 22 encodes each of the first image data and the second image data to generate the first coded data and the second coded data (step S102).

Subsequently, the generator 23 generates the auxiliary information (step S104). Then, the output unit 24 generates the transmission information including at least the first coded data and the second coded data (step S106). Thereafter, the output unit 24 outputs the transmission information (step S108) and this routine is finished.

Reproduction Device

Figure 5:
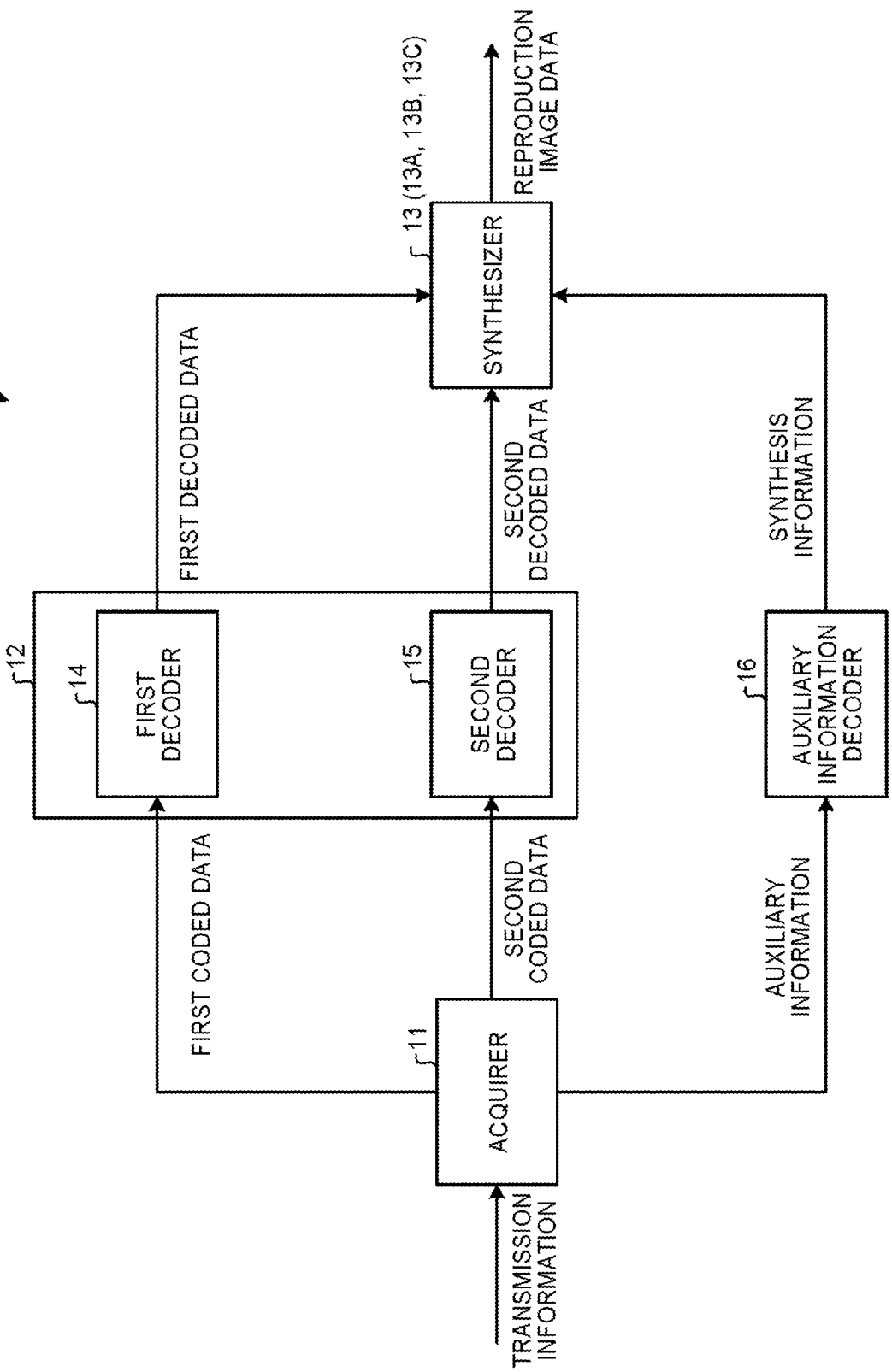
FIG. 5 is a block diagram illustrating the functional configuration of a reproduction device.

FIG. 5 is a block diagram illustrating the functional configuration of a reproduction device 10 in the embodiment.

The reproduction device 10 receives the transmission information from the encoding device 20 and generates and reproduces reproduction image data.

The reproduction device 10 includes an acquirer 11, a decoder 12, a synthesizer 13, and an auxiliary information decoder 16. Some or all of the acquirer 11, the decoder 12, the synthesizer 13, and the auxiliary information decoder 16 may be made to function by causing a processing device such as a CPU to execute a program, that is, by software, by hardware such as an IC, or by the software and the hardware in combination.

The acquirer 11 acquires the transmission information from the encoding device 20. As described above, the transmission information includes at least the first coded data and the second coded data. The transmission information may further include the auxiliary information.

As described above, the first coded data and the second coded data are the pieces of data that have been generated by performing the lossy encoding at least one of the first image data and the second image data generated by performing the conversion processes different from each other on the original image data.

The acquirer 11 decodes system information such as an ISO base file format and MPEG-2 TS and extracts the first coded data and the second coded data from the transmission information. Then, the acquirer 11 outputs the first coded data and the second coded data to the decoder 12.

Furthermore, when the received transmission information includes the auxiliary information, the acquirer 11 outputs the auxiliary information to the auxiliary information decoder 16.

The decoder 12 decodes the first coded data and the second coded data to generate first decoded data and second decoded data.

The decoder 12 includes a first decoder 14 and a second decoder 15.

The first decoder 14 decodes the first coded data to generate the first decoded data. The first decoder 14 outputs the first decoded data to the synthesizer 13. The second decoder 15 decodes the second coded data to generate the second decoded data. The second decoder 15 outputs the second decoded data to the synthesizer 13.

When the first coded data is data provided by encoding the first image data with the original image data set to the first image data, the first decoder 14 may further output the first decoded data to the outside (well-known display device or the like).

In the embodiment, two types of the pieces of coded data, the first coded data and the second coded data, are included in the transmission information.

It should be noted that the pieces of coded data included in the transmission information may be equal to or more than three types. In this case, it is sufficient that the decoder 12 includes decoders the number of which corresponds to the number of types of the pieces of coded data included in the transmission information. When the transmission information includes three types of pieces of coded data, it is sufficient that the decoder 12 includes three decoders (the first decoder 14, the second decoder 15, a third decoder (not illustrated)).

The auxiliary information decoder 16 receives the auxiliary information from the acquirer 11. The auxiliary information decoder 16 outputs the conversion information and the synthesis information included in the auxiliary information to the synthesizer 13. When the auxiliary information has been encoded, the auxiliary information decoder 16 decodes the auxiliary information and outputs the conversion information and the synthesis information included in the decoded auxiliary information to the synthesizer 13.

The synthesizer 13 synthesize the first and the second decoded data with adjusting pixel positions of the first and the second decoded data so that the pixel positions of the first and the second decoded data are identical to each other to generate reproduction image data.

The synthesizer 13 converts the first decoded data and the second decoded data such that the pixel positions thereof are identical to each other and synthesizes them to generate the reproduction image data. This conversion process corresponds to the conversion process having been performed on the original image data corresponding to the first decoded data and the second decoded data by the encoding device 20.

As described above, the conversion process is the lossy conversion process. Furthermore, as described above, the conversion process is at least one of cropping, reduction, enlargement, rotation, inversion, pixel movement, format conversion process, and pixel value conversion.

In the following, the cropping is described as an example of the conversion process performed on the original image data corresponding to the first decoded data and the second decoded data.

Figure 6:
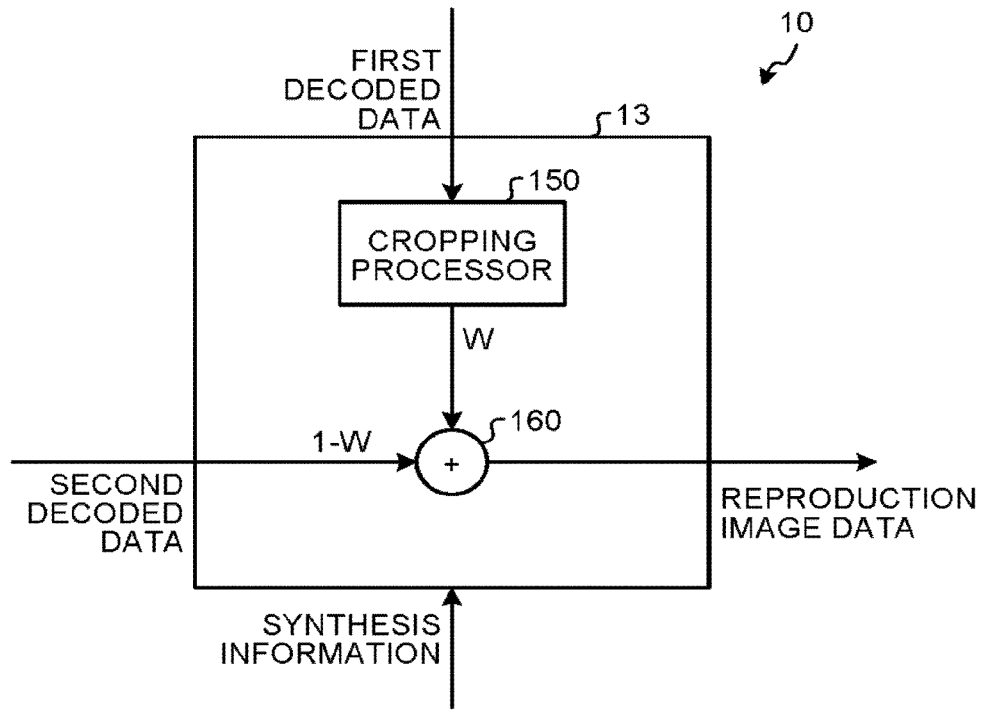
FIG. 6 is a block diagram of a synthesizer.

FIG. 6 is a block diagram of the synthesizer 13 in the reproduction device 10. In an example as illustrated in FIG. 6, the synthesizer 13 includes a cropping processor 150 and an adder 160.

The cropping processor 150 reads the conversion information included in the auxiliary information received from the auxiliary information decoder 16. For example, it is assumed that the conversion information includes information on cropping conditions at the time of the cropping (the segment start position and the segment size of each frame of the original image data). In this case, the cropping processor 150 takes, as a segment, an image having the read segment size at the read segment start position from each frame of the first decoded data. The cropping processor 150 uses the image data of the segment as the first decoded data on which the conversion process has been performed. With this process, the cropping processor 150 converts the first decoded data and the second decoded data such that the pixel positions thereof are identical to each other.

The adder 160 synthesizes the second decoded data and the first decoded data on which the cropping processor 150 has performed the conversion process to generate the reproduction image data.

In detail, the adder 160 of the synthesizer 13 generates the reproduction image data in which weighted average values of pixel values of the first decoded data and pixel values of the second decoded data each having been converted to have the identical pixel positions each other are set to pixel values of respective pixels after synthesis using the weighting coefficient W.

In more detail, the adder 160 generates the reproduction image data in which the weighted average values of the pixel values of the first decoded data and the pixel values of the second decoded data each having been converted so as to have the identical pixel positions each other are set to the pixel values of the respective pixels after synthesis using the second decoded data, the first decoded data on which the cropping processor 150 has performed the conversion process, and the weighting coefficient W contained in the synthesis information.

Specifically, the adder 160 generates the reproduction image data in which the weighted average values of values calculated by multiplying the pixel values of the pixels at respective pixel positions in the first decoded data (taken as segments) on which the cropping processor 150 has performed the conversion process by the weighting coefficient W and values calculated by multiplying the pixel values of the pixels at respective corresponding pixel positions in the second decoded data by "1−W" are set to the pixel values of the respective pixels after synthesis. It should be noted that the weighting coefficient W is a real number of equal to or higher than 0 and equal to or lower than 1. Furthermore, W of "1−W" is the weighting coefficient W.

The synthesizer 13 outputs the generated reproduction image data.

Alternatively, the synthesizer 13 may convert the first decoded data and the second decoded data such that the pixel positions thereof are identical to each other and may generate reproduction image data in which intermediate values of the pixel values of the respective pixels included in the first decoded data and the pixel values of the respective pixels included in the second decoded data each having been converted so as to have the identical pixel positions each other are set to the pixel values of the respective pixels after synthesis.

Specifically, the adder 160 of the synthesizer 13 may generate the reproduction image data in which average values (intermediate values) of the pixel values of the pixels at the respective pixel positions in the first decoded data (corresponding to the segment) on which the cropping processor 150 has performed the conversion process and the pixel values of the pixels at the respective corresponding pixel positions in the second decoded data for the respective pixels at the respective pixel positions are set to the pixel values of the respective pixels after synthesis.

As an adding method by the adder 160 of the synthesizer 13, a method using a what-is-called robust estimated value may be applied instead of the method using the weighted average value and the simple average value. For example, the adder 160 may use center values (middle values when a sample number is an odd number and an average of two middle values when the sample number is an even number) of the pixel values of the pixels at the respective pixel positions in the first decoded data (corresponding to the segment) on which the cropping processor 150 has performed the conversion process and the pixel values of the pixels at the respective corresponding pixel positions in the second decoded data.

Figure 7:
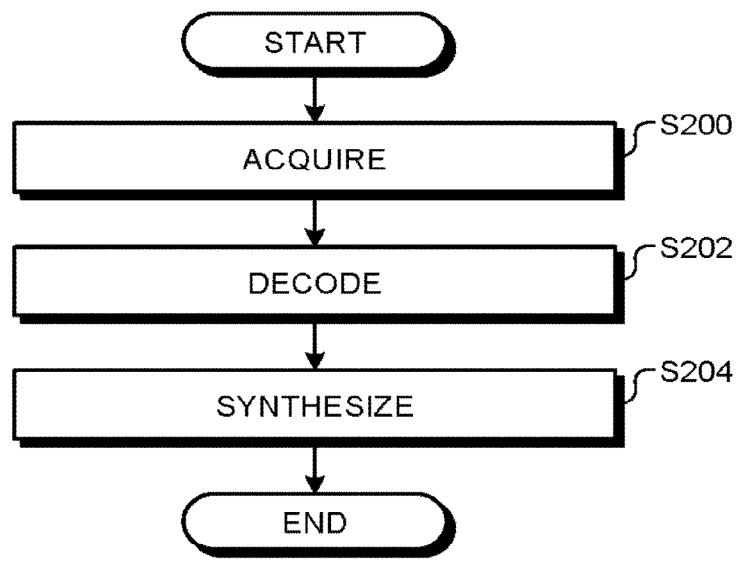
FIG. 7 is a flowchart illustrating procedures of reproduction process.

Next, procedures of the reproduction process that is executed by the reproduction device 10 will be described. FIG. 7 is a flowchart illustrating the procedures of the reproduction process that is executed by the reproduction device 10.

First, the acquirer 11 acquires the transmission information from the encoding device 20 (step S200). The decoder 12 decodes the first coded data and the second coded data to generate the first decoded data and the second decoded data (step S202).

Subsequently, the synthesizer 13 converts the first decoded data and the second decoded data such that the pixel positions thereof are identical to each other and synthesizes them to generate the reproduction image data (step S204). Then, this routine is finished.

As described above, in the embodiment, the encoding device 20 includes the converter 21, the encoder 22, and the output unit 24. The converter 21 performs the conversion processes different from each other on the original image data and converts the original image data into the first image data and the second image data. The encoder 22 performs the lossy encoding at least one of the first image data and the second image data to generate the first coded data and the second coded data. The output unit 24 outputs the transmission information including the first coded data and the second coded data.

Thus, the first coded data and the second coded data are the pieces of coded data generated by performing the lossy encoding at least one of the first image data and the second image data. Furthermore, the first image data and the second image data that are the pieces of data before the first coded data and the second coded data are provided by encoding are pieces of image data generated by performing the different conversion processes on the same original image data.

It is known that encoding distortion is generated in the lossy encoding. Different encoding distortions are therefore generated on the first coded data and the second coded data. In the embodiment, the encoding device 20 outputs the transmission information including the first coded data and the second coded data, generated from the same original image data, on which the different encoding distortions have been generated to the reproduction device 10.

The encoding device 20 can therefore generate the transmission information from which reproduction image data with improved image quality can be generated. Accordingly, the encoding device 20 in the embodiment can improve image quality of a reproduced image.

The reproduction device 10 in the embodiment includes the acquirer 11, the decoder 12, and the synthesizer 13. The acquirer 11 acquires the transmission information including the first and the second coded data that have been generated by encoding first and second image data respectively, at least one of the first and the second image data is lossy encoded, the first and the second image data being generated by performing conversion processes different from each other on original image data.

The decoder 12 decodes the first and the second coded data to generate the first and the second decoded data. The synthesizer 13 converts the first decoded data and the second decoded data such that the pixel positions thereof are identical to each other and synthesizes them to generate the reproduction image data.

Thus, the reproduction device 10 acquires the transmission information including the first coded data and the second coded data, generated from the same original image data, on which the different encoding distortions have been generated. Then, the synthesizer 13 synthesize the first and the second decoded data with adjusting pixel positions of the first and the second decoded data so that the pixel positions of the first and the second decoded data are identical to each other to generate reproduction image data.

The reproduction device 10 synthesizes the first decoded data and the second decoded data with the different encoding distortions in this manner so as to remove the encoding distortions and generate the reproduction image data with improved image quality.

Accordingly, the reproduction device 10 in the embodiment can improve the image quality of the reproduction image data.

Second Embodiment

In this embodiment, the conversion process is the reduction.

Encoding Device

FIG. 1 is a block diagram illustrating the functional configuration of an encoding device 20A in the embodiment.

The encoding device 20A encodes original image data. The encoding device 20A includes a converter 21A, the encoder 22, the generator 23, and the output unit 24. Some or all of the converter 21A, the encoder 22, the generator 23, and the output unit 24 may be made to function by causing a processing device such as a CPU to execute programs, that is, by software, by hardware such as an IC, or by software and hardware in combination, for example.

The encoding device 20A has the same configuration as that of the encoding device 20 other than a point that the encoding device 20A includes the converter 21A instead of the converter 21.

The converter 21A performs conversion processes different from each other on the original image data to convert the original image data into first image data and second image data in the same manner as the converter 21. That is to say, the first image data and the second image data are pieces of data provided by performing the different conversion processes on the original image data. One of the first image data and the second image data may be the original image data. Furthermore, the converter 21A may generate two types of pieces of input image data (first image data, second image data) by performing the different conversion processes on the original image data.

In the following, the reduction is described as an example of the conversion process performed by the converter 21A.

Figure 8:
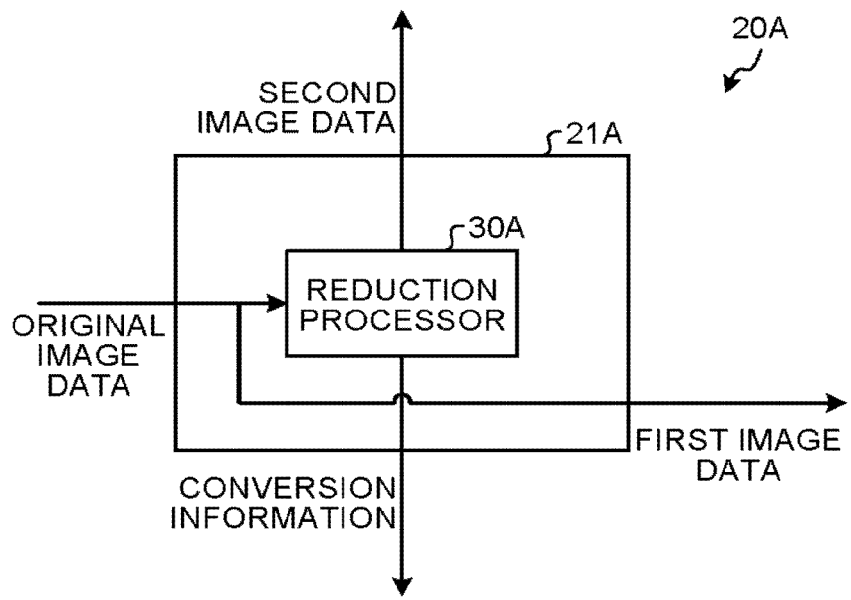
FIG. 8 is a block diagram of a converter.

FIG. 8 is a block diagram of the converter 21A in the encoding device 20A. In an example as illustrated in FIG. 8, the converter 21A includes a reduction processor 30A. In the embodiment, the converter 21A outputs the original image data as the first image data to the encoder 22. The reduction processor 30A of the converter 21A reduces an image size of the original image data and outputs it as the second image data to the encoder 22.

It should be noted that reduction targets on the original image data may be all of the luminance signal Y and the color difference signals Cb and Cr or only the color difference signals Cb and Cr.

The converter 21A outputs a reduction rate of the image size as conversion information to the generator 23. The processes by the encoder 22, the generator 23, and the output unit 24 are the same as those in the first embodiment.

That is to say, the encoder 22 of the encoding device 20A encodes the first image data and the second image data to generate first coded data and second coded data. Then, the generator 23 generates auxiliary information. Subsequently, the output unit 24 generates transmission information including at least the first coded data and the second coded data. The output unit 24 outputs the transmission information.

Reproduction Device

FIG. 5 is a block diagram illustrating the functional configuration of a reproduction device 10A in the embodiment.

The reproduction device 10A receives the transmission information from the encoding device 20A and generates and reproduces reproduction image data.

The reproduction device 10A includes the acquirer 11, the decoder 12, a synthesizer 13A, and the auxiliary information decoder 16. Some or all of the acquirer 11, the decoder 12, the synthesizer 13A, and the auxiliary information decoder 16 may be made to function by causing a processing device such as a CPU to execute a program, that is, by software, by hardware such as an IC, or by the software and the hardware in combination.

The reproduction device 10A has the same configuration as that of the reproduction device 10 in the first embodiment other than a point that the reproduction device 10A includes the synthesizer 13A instead of the synthesizer 13.

That is to say, the acquirer 11 of the reproduction device 10A acquires the transmission information from the encoding device 20A. The decoder 12 of the reproduction device 10A decodes the first coded data and the second coded data included in the transmission information to generate first decoded data and second decoded data. Then, the decoder 12 outputs the first decoded data and the second decoded data to the synthesizer 13A. The synthesizer 13A receives conversion information and synthesis information from the auxiliary information decoder 16.

The synthesizer 13A converts the first decoded data and the second decoded data such that the pixel positions thereof are identical to each other and synthesizes them to generate reproduction image data in the same manner as the synthesizer 13.

In the following, the reduction is described as an example of the conversion process performed on the original image data corresponding to the first decoded data and the second decoded data.

Figure 9:
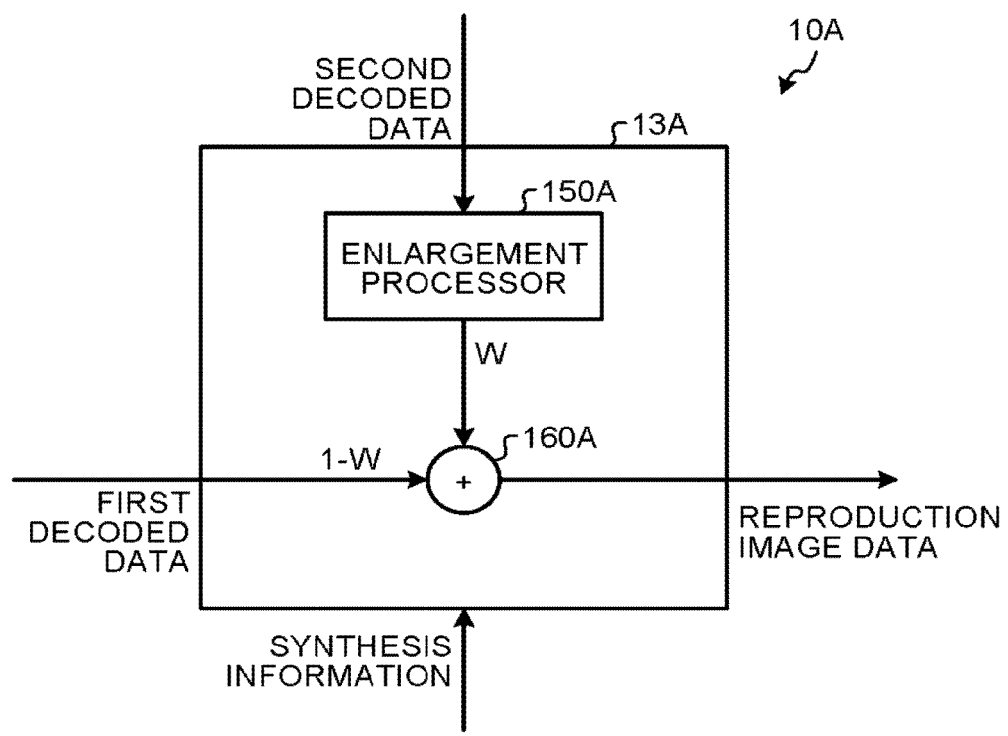
FIG. 9 is a block diagram of a synthesizer.

FIG. 9 is a block diagram of the synthesizer 13A in the reproduction device 10A. In an example as illustrated in FIG. 9, the synthesizer 13A includes an enlargement processor 150A and an adder 160A.

The enlargement processor 150A reads the conversion information included in the auxiliary information received from the auxiliary information decoder 16. For example, it is assumed that the conversion information includes the reduction rate. In this case, the enlargement processor 150A performs inverse conversion process of the conversion process performed on the original image data corresponding to the first coded data and the second coded data. In the embodiment, the synthesizer 13A performs enlargement inverse to the reduction.

That is to say, the enlargement processor 150A of the synthesizer 13A calculates an enlargement rate inverse to the reduction rate based on the reduction rate included in the conversion information. Then, the enlargement processor 150A enlarges the image size of the second decoded data at the calculated enlargement rate. The enlargement processor 150A uses the enlarged image data as the second decoded data on which the inverse conversion process has been performed. With this process, the enlargement processor 150A converts the first decoded data and the second decoded data such that the pixel positions thereof are identical to each other.

Enlargement targets by the enlargement processor 150A may be all of the luminance signal Y and the color difference signals Cb and Cr of the second decoded data or the color difference signals Cb and Cr thereof alone. Furthermore, the first decoded data and the second decoded data may be pieces of RGB data.

The enlargement processor 150A may convert the first decoded data and the second decoded data such that the pixel positions thereof are identical to each other by enlarging or reducing at least one of the first decoded data and the second decoded data.

The adder 160A synthesizes the second decoded data enlarged by the enlargement processor 150A and the first decoded data to generate reproduction image data.

In detail, the adder 160A generates the reproduction image data in which weighted average values of pixel values of the first decoded data and pixel values of the second decoded data each having been converted so as to have the identical pixel positions each other are set to pixel values of respective pixels after synthesis using the weighting coefficient W included in the synthesis information in the same manner as the adder 160 in the first embodiment.

The adder 160A may generate the reproduction image data using intermediate values of the pixel values of the respective pixels included in the first decoded data and the pixel values of the respective pixels included in the second decoded data each having been converted so as to have the identical pixel positions each other, average values, robust estimated values, or the like thereof in the same manner as the adder 160 in the first embodiment.

As described above, in the embodiment, the converter 21A of the encoding device 20A performs reduction as the conversion process. Furthermore, the synthesizer 13A (enlargement processor 150A) of the reproduction device 10A performs reduction or enlargement on at least one of the first decoded data and the second decoded data to covert the first decoded data and the second decoded data such that the pixel positions thereof are identical to each other.

Thus, even when the reduction is employed as the conversion process, the encoding device 20A can generate the transmission information from which the reproduction image data with improved image quality can be generated as in the first embodiment. Accordingly, the encoding device 20A in the embodiment can improve image quality of a reproduced image.

Furthermore, the reproduction device 10A in the embodiment synthesizes the first decoded data and the second decoded data with the different encoding distortions so as to remove the encoding distortions and generate the reproduction image data with improved image quality.

Accordingly, the reproduction device 10A in the embodiment can improve the image quality of the reproduction image data.

In the embodiment, the converter 21A of the encoding device 20A outputs the original image data as the first image data and reduces the original image data to generate the second image data. Alternatively, the converter 21A may generate the first image data and the second image data from the original image data by performing reductions on the original image data under different reduction conditions.

In the embodiment, the synthesizer 13A of the reproduction device 10A enlarges the second decoded data as the inverse conversion process. Alternatively, the synthesizer 13A may perform the inverse conversion process and the conversion process on both of the first decoded data and the second decoded data.

Although the converter 21A of the encoding device 20A performs the reduction as the conversion process and the synthesizer 13A of the reproduction device 10A performs the enlargement as the inverse conversion process in the embodiment, the converter 21A may perform another conversion process and the synthesizer 13A may perform at least one of another conversion process and another inverse conversion process.

For example, the reduction processor 30A of the encoding device 20A may perform rotation of rotating the original image data instead of the reduction. For example, the reduction processor 30A may perform rotation of rotating an image of each frame of the original image data by 90°, 180°, or 270° clockwise. Then, the reduction processor 30A may output the rotated original image data as the second image data.

It is sufficient that the reduction processor 30A outputs a rotating angle and a rotating direction as the conversion information.

In this case, it is sufficient that the enlargement processor 150A of the reproduction device 10A performs inverse rotation of the above-mentioned rotation on the second decoded data based on the conversion information. For example, the enlargement processor 150A performs rotation of rotating an image of each frame of the second decoded data by 90°, 180°, or 270° counterclockwise.

Alternatively, the reduction processor 30A of the encoding device 20A may perform the process of inverting an image of each frame of the original image data instead of the reduction. For example, the reduction processor 30A may perform the process of inverting the image of each frame of the original image data in the right-left direction, the up-down direction, or the right-left and up-down directions. The reduction processor 30A may output the inverted original image data as the second image data. It is sufficient that the reduction processor 30A outputs an inverting direction as the conversion information.

In this case, it is sufficient that the enlargement processor 150A of the reproduction device 10A performs reverse inversion of the above-mentioned inversion on the second decoded data based on the conversion information. For example, it is sufficient that the enlargement processor 150A performs the process of inverting the image of each frame of the second decoded data in the reverse inversion direction (the right-left direction, the up-down direction, or the right-left and up-down directions).

Furthermore, the reduction processor 30A of the encoding device 20A may perform pixel movement of displacing pixel positions of pixels of each frame of the original image data in the right-left direction or the up-down direction by M pixels (M is an integer) instead of the reduction. In this case, it is sufficient that the reduction processor 30A moves pixels protruding from each frame to the opposite side.

That is to say, when the reduction processor 30A shifts the pixel positions of the pixels of each frame in the right-left direction, it shifts the pixel positions to positions of (x+M+width) % width, where width is the size of a screen (frame) in the horizontal direction and x is a pixel position in the horizontal direction.

When the reduction processor 30A shifts the pixel positions of the pixels of each frame in the up-down direction, it shifts the pixel positions to positions of (y+M+height) % height, where height is the size of the screen (frame) in the perpendicular direction and y is a pixel position in the perpendicular direction.

Note that "%" indicates integer arithmetic of calculating a remainder by division.

In this case, it is sufficient that the enlargement processor 150A of the reproduction device 10A performs the process of shifting pixels on the screen (frame) in the right-left direction or the up-down direction by −M pixels in order to return the shifted pixel positions to original positions instead of the enlargement. In the process, a value deviated from a unit of the encoding process is preferably used as the value of M in the same manner as the segment position (see FIG. 3).

That is to say, it is assumed that a color difference format of the original image data is a 4:2:0 format. In this case, the two color difference signals Cb and Cr have pixels the number of which is only half that of the luminance signal Y in the vertical and horizontal directions. Thus, it is sufficient that the position to be shifted from the original image data is 4N+2 (N is an integer equal to or greater than 0), for example.

It is assumed that the color difference format of the original image data is a 4:2:2 format. In this case, the two color difference signals Cb and Cr have pixels the number of which is half that of the luminance signal Y in the horizontal direction. Thus, it is sufficient that the position to be shifted from the original image data is 4N+2 (N is an integer equal to or greater than 0) when the position is shifted in the right-left direction, and the position to be shifted from the original image data is 2N+1 (N is an integer equal to or greater than 0) when the position is shifted in the up-down direction.

It is assumed that the color difference format of the original image data is a 4:4:4 format. In this case, the two color difference signals Cb and Cr have pixels the number of which is the same as that of the luminance signal. Thus, the position to be shifted from the original image data may be set to 2N+1 (N is an integer equal to or greater than 0) when the position is shifted in each of the right-left direction and the up-down direction.

The enlargement processor 150A may perform extension of a pixel bit length (for example, extension to 10 bits from 8 bits) or degeneration (for example, degeneration to 8 bits from 10 bits) to correspond to the reduction processor 30A of the encoding device 20A.

Third Embodiment

In this embodiment, the conversion process is reduction by down-sampling process, color conversion (for example, color conversion of converting a color space of an RGB system to a color space of a CMYK system), gamma conversion, Wavelet conversion, color space conversion of converting BT.2020 to BT.709, conversion process of degenerating a pixel bit length to 8 bits from 10 bits, or the like.

Encoding Device

FIG. 1 is a block diagram illustrating the functional configuration of an encoding device 20B in the embodiment.

The encoding device 20B encodes original image data. The encoding device 20B includes a converter 21B, the encoder 22, the generator 23, and the output unit 24. Some or all of the converter 21B, the encoder 22, the generator 23, and the output unit 24 may be made to function by causing a processing device such as a CPU to execute programs, that is, by software, by hardware such as an IC, or by software and hardware in combination, for example.

The encoding device 20B has the same configuration as that of the encoding device 20 other than a point that the encoding device 20B includes the converter 21B instead of the converter 21.

The converter 21B performs conversion processes different from each other on the original image data to convert the original image data into first image data and second image data in the same manner as the converter 21. That is to say, the first image data and the second image data are pieces of data provided by performing the different conversion processes on the original image data. One of the first image data and the second image data may be the original image data. Furthermore, the converter 21B may generate two types of pieces of input image data (the first image data, the second image data) by performing the different conversion processes on the original image data.

In the following, Wavelet conversion, color gamma conversion, color space conversion of converting BT.2020 to BT.709, pixel value conversion such as degeneration of the pixel bit length to 8 bits from 10 bits, or reduction by down-sampling process is described as an example of the conversion process performed by the converter 21B.

Figure 10:
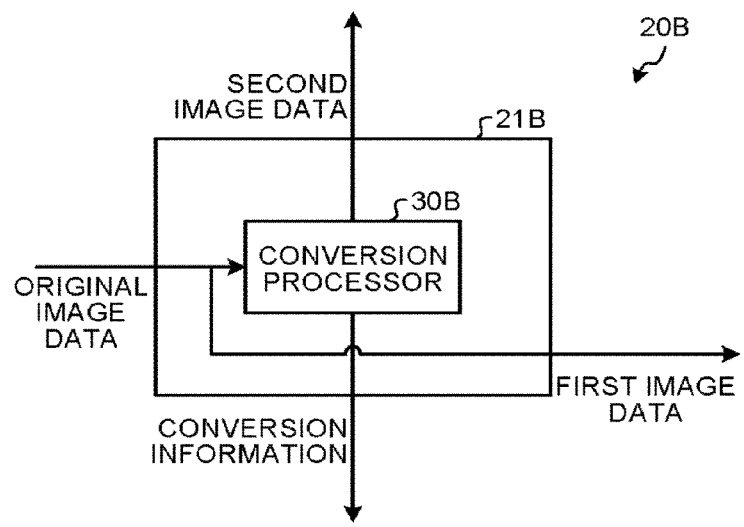
FIG. 10 is a block diagram of a converter.

FIG. 10 is a block diagram of the converter 21B in the encoding device 20B. In an example as illustrated in FIG. 10, the converter 21B includes a conversion processor 30B. In the embodiment, the conversion processor 30B outputs the original image data as the first image data to the encoder 22. The conversion processor 30B of the converter 21B performs, on the original image data, any conversion process of the Wavelet conversion, the color gamma conversion, the color space conversion of converting BT.2020 to BT.709, the process of degenerating the pixel bit length to 8 bits from 10 bits, and the reduction by the down-sampling process and outputs the result as the second image data to the encoder 22.

The converter 21B outputs conversion information on the conversion process performed by the conversion processor 30B to the generator 23. The processes by the encoder 22, the generator 23, and the output unit 24 are the same as those in the first embodiment.

That is to say, the encoder 22 of the encoding device 20B encodes each of the first image data and the second image data to generate first coded data and second coded data. Then, the generator 23 generates auxiliary information. Subsequently, the output unit 24 generates transmission information including at least the first coded data and the second coded data. The output unit 24 outputs the transmission information.

Reproduction Device

FIG. 5 is a block diagram illustrating the functional configuration of a reproduction device 10B in the embodiment.

The reproduction device 10B receives the transmission information from the encoding device 20B and generates and reproduces reproduction image data.

The reproduction device 10B includes the acquirer 11, the decoder 12, a synthesizer 13B, and the auxiliary information decoder 16. Some or all of the acquirer 11, the decoder 12, the synthesizer 13B, and the auxiliary information decoder 16 may be made to function by causing a processing device such as a CPU to execute a program, that is, by software, by hardware such as an IC, or by the software and the hardware in combination.

The reproduction device 10B has the same configuration as that of the reproduction device 10 in the first embodiment other than a point that the reproduction device 10B includes the synthesizer 13B instead of the synthesizer 13.

That is to say, the acquirer 11 of the reproduction device 10B acquires the transmission information from the encoding device 20B. The decoder 12 of the reproduction device 10B decodes the first coded data and the second coded data included in the transmission information to generate first decoded data and second decoded data. Then, the decoder 12 outputs the first decoded data and the second decoded data to the synthesizer 13B. The synthesizer 13B receives conversion information and synthesis information from the auxiliary information decoder 16.

The synthesizer 13B converts the first decoded data and the second decoded data such that the pixel positions thereof are identical to each other and synthesizes them to generate reproduction image data in the same manner as the synthesizer 13.

In the following, any of the Wavelet conversion, the color gamma conversion, the color space conversion of converting BT.2020 to BT.709, the process of degenerating the pixel bit length to 8 bits from 10 bits, and the reduction by the down-sampling process is described as an example of the conversion process performed on the original image data corresponding to the first decoded data and the second decoded data.

Figure 11:
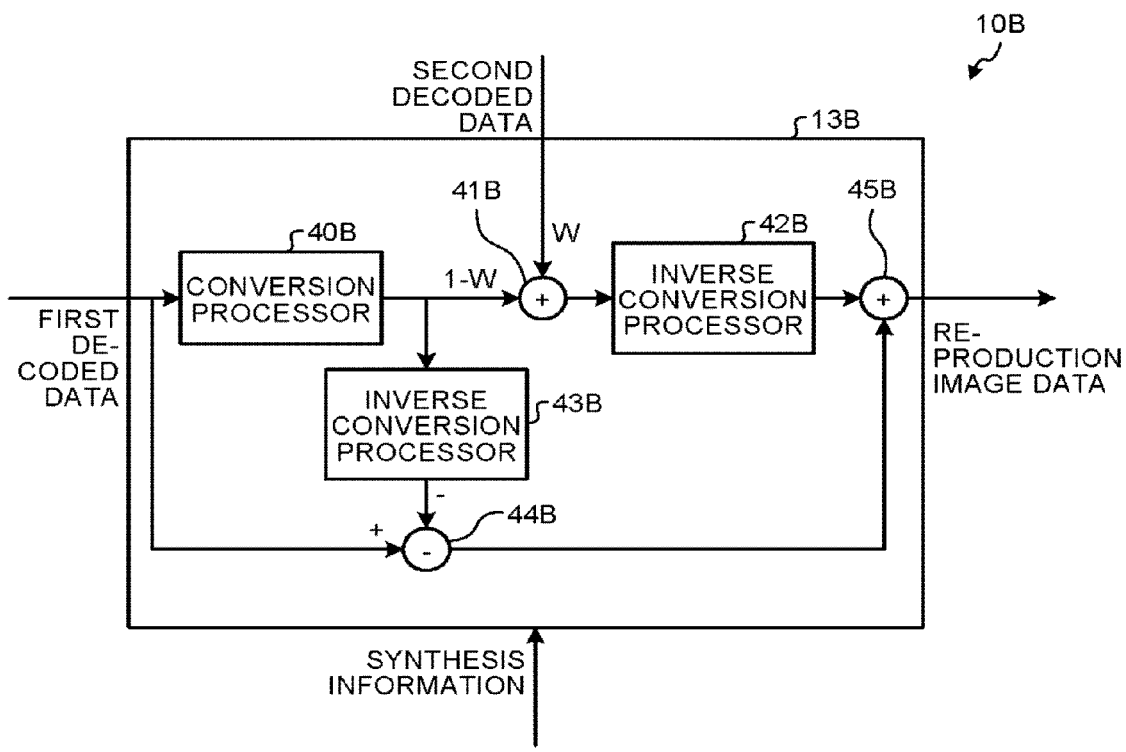
FIG. 11 is a block diagram of a synthesizer.

FIG. 11 is a block diagram of the synthesizer 13B in the reproduction device 10B. In an example as illustrated in FIG. 11, the synthesizer 13B includes a conversion processor 40B, an adder 41B, an inverse conversion processor 42B, an adder 45B, an inverse conversion processor 43B, and a subtractor 44B.

The first decoded data received by the synthesizer 13B is input to the conversion processor 40B and the subtractor 44B. The conversion processor 40B performs the conversion process identical to that by the conversion processor 30B of the encoding device 20B. The conversion processor 40B outputs the first decoded data on which the conversion process has been performed to the adder 41B and the inverse conversion processor 43B.

The inverse conversion processor 43B performs inverse conversion process that is conversion process inverse to the conversion process performed by the conversion processor 30B on the first decoded data that has been received from the conversion processor 40B and on which the conversion process has been performed and outputs the result to the subtractor 44B.

The inverse conversion process is inverse conversion process of the conversion process performed by the conversion processor 30B.

Specifically, it is assumed that the conversion process performed on the original image data by the conversion processor 30B of the encoding device 20B is the reduction by down-sampling process. In this case, the inverse conversion process of the conversion process is enlargement by up-sampling process.

It is assumed that the conversion process performed on the original image data by the conversion processor 30B of the encoding device 20B is the color gamma conversion. In this case, the inverse conversion process of the conversion process is inverse color gamma processing.

It is assumed that the conversion process performed on the original image data by the conversion processor 30B of the encoding device 20B is the color space conversion of converting BT.2020 to BT.709. In this case, the inverse conversion process of the conversion process is color space inverse conversion process of returning to BT.2020 from BT.709.

It is assumed that the conversion process performed on the original image data by the conversion processor 30B of the encoding device 20B is the process of degenerating the pixel bit length to 8 bits from 10 bits. In this case, the inverse conversion process of the conversion process is the process of extending the pixel bit length to 10 bits from 8 bits.

The subtractor 44B calculates a difference between the first decoded data received from the decoder 12 and the first decoded data that has been received from the inverse conversion processor 43B and on which the conversion process and the inverse conversion process have been performed, and outputs the result to the adder 45B.

On the other hand, the adder 41B synthesizes the first decoded data and the second decoded data using weighted average values calculated using the first decoded data that has been received from the conversion processor 40B and on which the conversion process has been performed, the second decoded data received from the decoder 12, and the weighting coefficient W included in the synthesis information, and outputs the result to the inverse conversion processor 42B.

Specifically, the adder 41B synthesizes them by setting weighted average values of values calculated by multiplying the pixel values of the pixels at the respective pixel positions in the second decoded data received from the decoder 12 by the weighting coefficient W and values calculated by multiplying the pixel values of the pixels at the respective corresponding pixel positions in the first decoded data on which the conversion process has been performed by "1−W" to the pixel values of the respective pixels after synthesis.

The inverse conversion processor 42B performs inverse conversion process of the conversion process performed by the conversion processor 30B on the decoded data that has been received from the adder 41B and has been weighting-averaged (synthesized) and outputs it to the adder 45B.

The adder 45B adds the difference received from the subtractor 44B and the decoded data received from the inverse conversion processor 42B to generate and output reproduction image data.

As described above, the reproduction device 10B in the embodiment performs, on the first decoded image data, the conversion process identical to the conversion process performed on the original image data to calculate weighted averages of the first decoded image data and the second decoded image data. Furthermore, the difference between the first decoded data and the data provided by further performing the inverse conversion process performed on the first decoded image data on which the conversion process has been performed is calculated. Then, the difference and the weighted averages are added to generate the reproduction image data.

With this process, the reproduction device 10B in the embodiment can reduce an error with the inverse conversion process in addition to effects provided by the above-mentioned embodiments. Accordingly, the embodiment can further improve the image quality of the reproduction image data in addition to the effects provided by the above-mentioned embodiments.

Fourth Embodiment

In the embodiment, a reproduction device 10C is used instead of the reproduction device 10B in the third embodiment.

Reproduction Device

FIG. 5 is a block diagram illustrating the functional configuration of the reproduction device 10C in the embodiment.

The reproduction device 10C receives transmission information from the encoding device 20B (see FIG. 5, FIG. 10) and generates and reproduces reproduction image data.

The reproduction device 10C includes the acquirer 11, the decoder 12, a synthesizer 13C, and the auxiliary information decoder 16. Some or all of the acquirer 11, the decoder 12, the synthesizer 13C, and the auxiliary information decoder 16 may be made to function by causing a processing device such as a CPU to execute a program, that is, by software, by hardware such as an IC, or by the software and the hardware in combination.

The reproduction device 10C has the same configuration as that of the reproduction device 10 in the first embodiment other than a point that the reproduction device 10C includes the synthesizer 13C instead of the synthesizer 13.

That is to say, the acquirer 11 of the reproduction device 10C acquires transmission information from the encoding device 20B. The decoder 12 of the reproduction device 10C decodes first coded data and second coded data included in the transmission information to generate first decoded data and second decoded data. Then, the decoder 12 outputs the first decoded data and the second decoded data to the synthesizer 13C. The synthesizer 13C receives conversion information and synthesis information from the auxiliary information decoder 16.

The synthesizer 13C converts the first decoded data and the second decoded data such that the pixel positions thereof are identical to each other and synthesizes them to generate reproduction image data in the same manner as the synthesizer 13.

In the following, the Wavelet conversion is described as an example as an example of the conversion process performed on the original image data corresponding to the first decoded data and the second decoded data.

Figure 12:
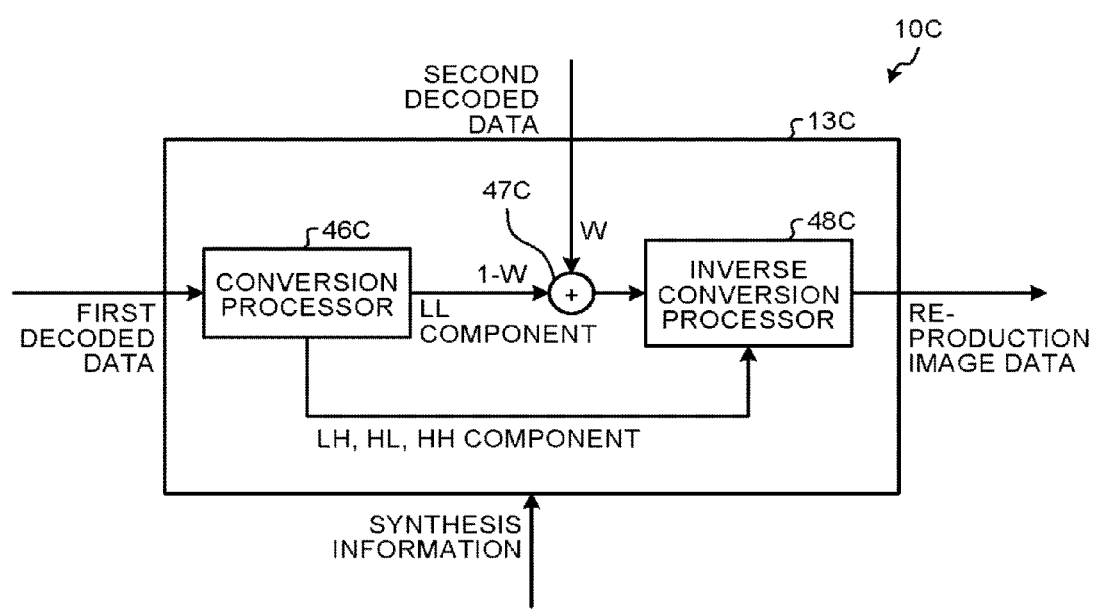
FIG. 12 is a block diagram of a synthesizer.

FIG. 12 is a block diagram of the synthesizer 13C in the reproduction device 10C. In an example as illustrated in FIG. 12, the synthesizer 13C includes a conversion processor 46C, an adder 47C, and an inverse conversion processor 48C.

The conversion processor 46C performs, on the first decoded data received from the decoder 12, two-dimensional Wavelet conversion identical to the conversion process performed on the original image data by the encoding device 20B using the synthesis information. With the conversion process, the conversion processor 46C divides the first decoded data into a low-low (LL) component, a low-high (LH) component, and a high-high (HH) component, and outputs the LL component to the adder 47C and outputs the LH component, the HL component, and the HH component to the inverse conversion processor 48C.

The adder 47C calculates weighted average using the LL component received from the conversion processor 46C, the second decoded data received from the decoder 12, and the weighting coefficient W included in the synthesis information, and outputs the weighted average to the inverse conversion processor 48C.

Specifically, the adder 47C outputs, to the inverse conversion processor 48C, the weighted average of values calculated by multiplying pixel values of pixels at respective pixel positions of the LL component in the first decoded data that has been received from the conversion processor 46C and on which the conversion process has been performed by "1−W" (W is a weighting coefficient) and values calculated by multiplying pixel values of pixels at respective corresponding pixel positions in the second decoded data received from the decoder 12 by the weighting coefficient W.

The inverse conversion processor 48C performs the inverse Wavelet conversion using the output from the adder 47C and the LH component, the HL component, and the HH component received from the conversion processor 46C as inputs and outputs the result as reproduction image data.

As described above, the reproduction device 10B in the embodiment performs the Wavelet conversion as the conversion process that is performed on the original image data. Then, the reproduction device 10C performs the Wavelet conversion identical to the conversion process performed on the original image data, inverse Wavelet conversion of the Wavelet conversion, or the like, on the first decoded data and the second decoded data to generate reproduction image data.

The Wavelet conversion enables conversion process and inverse conversion process to be performed with almost no error. The reproduction device 10C in the embodiment can reduce the error occurring during the inverse conversion process with a simple configuration as illustrated in FIG. 12 without employing the configuration of the synthesizer 13B (see FIG. 11) in the above-mentioned embodiment. Accordingly, the embodiment can further improve the image quality of the reproduction image data in addition to effects provided by the above-mentioned embodiments.

Fifth Embodiment

In the embodiment, an image reproduction system will be described.

Figure 13:
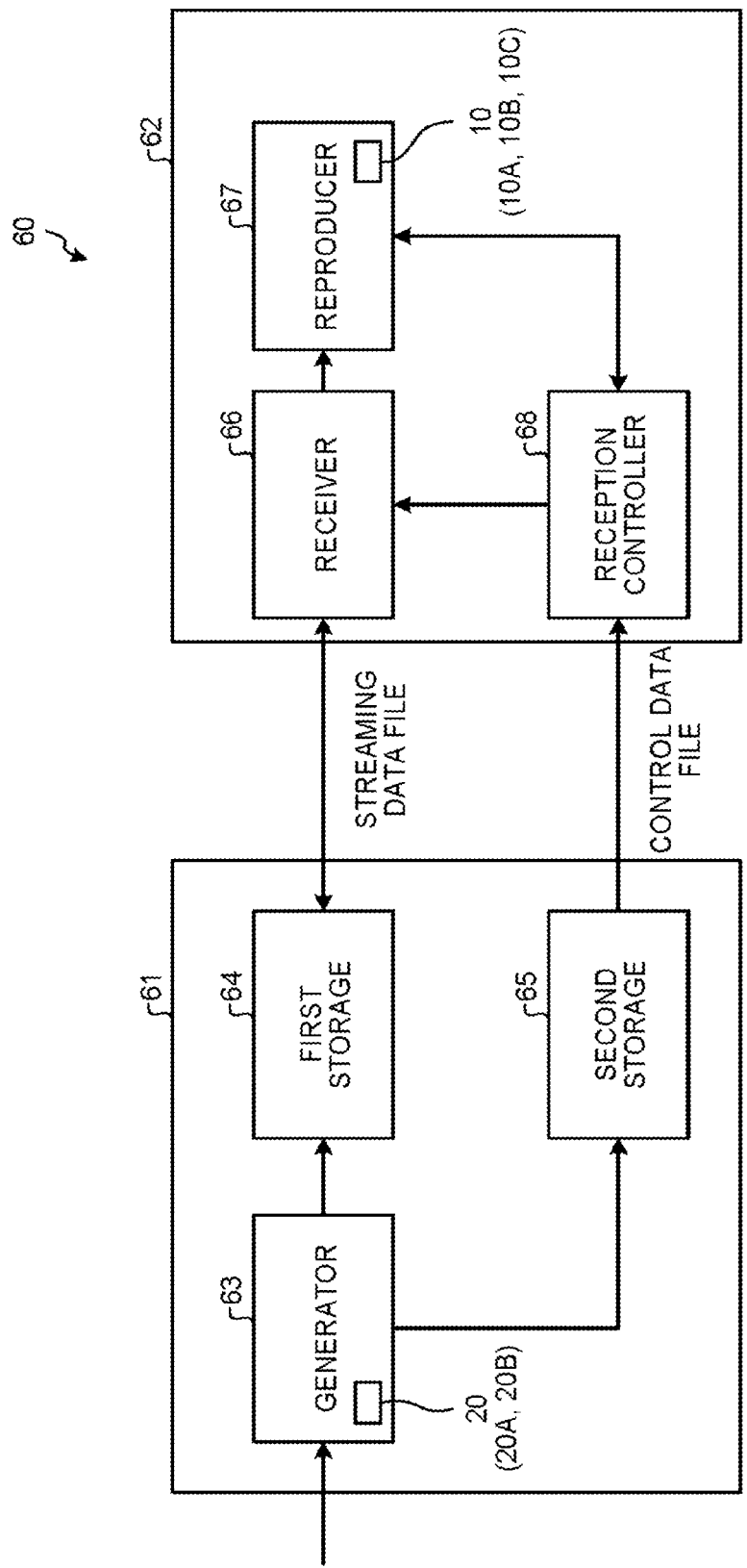
FIG. 13 is a view illustrating the functional configuration of an image reproduction system.

FIG. 13 is a view illustrating the functional configuration of an image reproduction system 60 in the embodiment.

The image reproduction system 60 is an adaptive streaming system related to audio/visual data.

The image reproduction system 60 includes a server unit 61 and a client unit 62. The server unit 61 and the client unit 62 are connected so as to transmit and receive data and signals.

The server unit 61 receives multimedia data such as the audio/visual data as the original image data and outputs a streaming data file as coded data provided by encoding the original image data and a control data file in which information related to a structure of the streaming data file is recorded.

The server unit 61 includes a generator 63, a first storage 64, and a second storage 65. The generator 63 receives the multimedia data such as the audio/visual data as the original image data. The generator 63 includes the encoding device 20, the encoding device 20A, or the encoding device 20B as described in the above-mentioned embodiments.

The generator 63 generates transmission information and auxiliary information from the received original image data. The generation of the transmission information and the auxiliary information by the generator 63 is performed by the encoding device 20, the encoding device 20A, or the encoding device 20B as described in the above-mentioned embodiments. The generator 63 outputs the transmission information to the first storage 64 and outputs the auxiliary information to the second storage 65.

The second storage 65 stores control data including the auxiliary information received from the generator 63. The second storage 65 outputs a control data file including the control data to the client unit 62 in accordance with a request from the client unit 62.

The first storage 64 stores streaming data including the transmission information received from the generator 63. The first storage 64 outputs the streaming data file including the streaming data to the client unit 62 in accordance with a request from the client unit 62.

The client unit 62 downloads the control data file from the server unit 61, accesses the streaming data file of the server unit 61, and reproduces the multimedia data such as the audio/visual data.

The client unit 62 includes a receiver 66, a reproducer 67, and a reception controller 68.

The reception controller 68 downloads the control data file from the server unit 61, analyzes the structure of the streaming data file, and transmits an analyzed result to the receiver 66.

The receiver 66 requests the streaming data file from the server unit 61 based on a transmission state and the request from the reproducer 67 with the analyzed result received from the reception controller 68. The receiver 66 outputs the streaming data downloaded from the server unit 61 to the reproducer 67.

The reproducer 67 reproduces the multimedia data such as the audio/visual data. The reproducer 67 includes the reproduction device 10, the reproduction device 10A, the reproduction device 10B, or the reproduction device 10C as described in the above-mentioned embodiments.

The reproducer 67 generates and reproduces reproduction image data using the transmission information included in the streaming data file and the auxiliary information included in the control data file. The generation of the reproduction image data is performed by the reproduction device 10, the reproduction device 10A, the reproduction device 10B, or the reproduction device 10C.

The image reproduction system 60 in the embodiment includes the encoding device 20, the encoding device 20A, or the encoding device 20B on the server unit 61 and includes the reproduction device 10, the reproduction device 10A, the reproduction device 10B, or the reproduction device 10C on the client unit 62.

Accordingly, the image reproduction system 60 in the embodiment can improve the image quality of the reproduction image data.

Sixth Embodiment

Figure 14:
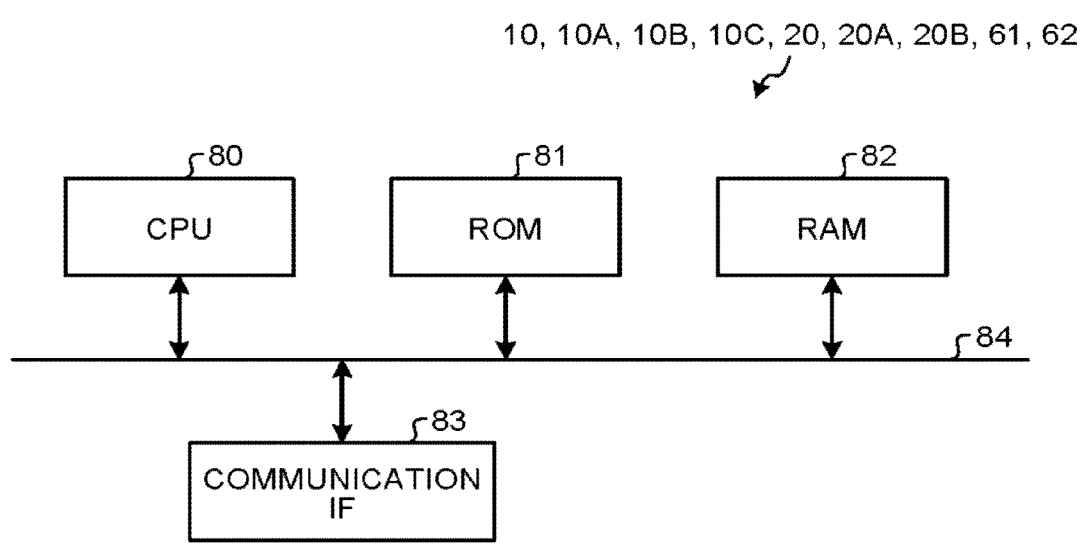
FIG. 14 is a block diagram illustrating the hardware configuration.

In the embodiment, the hardware configurations of the reproduction device 10, the reproduction device 10A, the reproduction device 10B, the reproduction device 10C, the encoding device 20, the encoding device 20A, the encoding device 20B, the server unit 61, and the client unit 62 as described in the above-mentioned embodiments will be described. FIG. 14 is a block diagram illustrating the hardware configurations of the reproduction device 10, the reproduction device 10A, the reproduction device 10B, the reproduction device 10C, the encoding device 20, the encoding device 20A, the encoding device 20B, the server unit 61, and the client unit 62.

The reproduction device 10, the reproduction device 10A, the reproduction device 10B, or the reproduction device 10C, the encoding device 20, the encoding device 20A, or the encoding device 20B, the server unit 61, and the client unit 62 have the hardware configurations using a normal computer in which a communication interface (IF) 83, a CPU 80, a read only memory (ROM) 81, a random access memory (RAM) 82, and the like are connected to one another via a bus 84.

The CPU 80 is an arithmetic device controlling the entire process on each of the reproduction device 10, the reproduction device 10A, the reproduction device 10B, or the reproduction device 10C, the encoding device 20, the encoding device 20A, or the encoding device 20B, the server unit 61, and the client unit 62. The RAM 82 stores therein data necessary for various processes by the CPU 80. The ROM 81 stores therein programs and the like executing various processes by the CPU 80. The communication interface (IF) 83 is an interface connected to an external device via a communication line and transmitting and receiving the data to and from the connected external device.

Programs for executing the processes that are executed by the reproduction device 10, the reproduction device 10A, the reproduction device 10B, or the reproduction device 10C, the encoding device 20, the encoding device 20A, or the encoding device 20B, the server unit 61, and the client unit 62 are embedded and provided in the ROM 81 or the like.

The programs for executing the processes that are executed by the reproduction device 10, the reproduction device 10A, the reproduction device 10B, or the reproduction device 10C, the encoding device 20, the encoding device 20A, or the encoding device 20B, the server unit 61, and the client unit 62 may be recorded and provided in a computer-readable recording medium such as a compact disc read only memory (CD-ROM), a flexible disk (FD), a compact disc recordable (CD-R), and a digital versatile disc (DVD), as a file installable or executable in the reproduction device 10, the reproduction device 10A, the reproduction device 10B, or the reproduction device 10C, the encoding device 20, the encoding device 20A, or the encoding device 20B, the server unit 61, and the client unit 62.

The programs for executing the processes that are executed by the reproduction device 10, the reproduction device 10A, the reproduction device 10B, or the reproduction device 10C, the encoding device 20, the encoding device 20A, or the encoding device 20B, the server unit 61, and the client unit 62 may be stored in a computer connected to a network such as the Internet and provided by being downloaded via the network. Furthermore, the programs for executing the processes that are executed by the reproduction device 10, the reproduction device 10A, the reproduction device 10B, or the reproduction device 10C, the encoding device 20, the encoding device 20A, or the encoding device 20B, the server unit 61, and the client unit 62 may be provided or distributed via a network such as the Internet.

The programs for executing the processes that are executed by the reproduction device 10, the reproduction device 10A, the reproduction device 10B, or the reproduction device 10C, the encoding device 20, the encoding device 20A, or the encoding device 20B, the server unit 61, and the client unit 62 have a module structure including the above-mentioned respective units. As actual hardware, the CPU 80 reads and executes various types of programs from the ROM 81 or the like, so that the above-mentioned respective units are loaded on a main storage device and the above-mentioned functional configurations are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reproduction device comprising:
   circuitry configured to:
   acquire transmission information including first and second coded data generated by encoding first and second image data respectively, at least one of the first and the second image data is lossy encoded, the first and the second image data being generated by performing conversion processes different from each other on original image data;
   decode the first and the second coded data to generate first and second decoded data; and
   convert the first and the second decoded data so that the pixel positions of the first and the second decoded data are identical to each other to generate reproduction image data, wherein
   weighted average values or weighted intermediate values of pixel values obtained by weighting, using a weighting coefficient, respective pixels included in the first and the second decoded data each having been converted to have identical pixel positions to each other are set to pixel values of respective pixels after synthesis, and
   the weighting coefficient is a value in accordance with a ratio of an inverse of a square of a standard deviation of an encoding distortion of the first coded data and a square of a standard deviation of an encoding distortion of the second coded data, wherein the standard deviation is calculated based on image size and the pixel positions in horizontal and perpendicular directions.

2. The reproduction device according to claim 1, wherein the circuitry performs at least one of the conversion process and inverse conversion process of the conversion process on at least one of the first and the second decoded data to convert the first and the second decoded data such that the pixel positions of the first and the second decoded data are identical to each other.

3. The reproduction device according to claim 1, wherein
   the circuitry further configured to acquire the transmission information including auxiliary information that includes conversion information on the conversion process performed on each of the first and the second coded data, and
   perform at least one of the conversion process and inverse conversion process of the conversion process on at least one of the first and the second decoded data based on the conversion information to convert the first and the second decoded data such that the pixel positions of the first and the second decoded data are identical.

4. The reproduction device according to claim 3, wherein
   the auxiliary information includes the weighting coefficient, and
   the circuitry further configured to convert the first and the second decoded data such that the pixel positions of the first and the second decoded data are identical to each other to generate the reproduction image data in which weighted average values of pixel values of the first and the second decoded data each having been converted so as to have identical pixel positions each other are set to pixel values of respective pixels after synthesis using the weighting coefficient.

5. The reproduction device according to claim 1, wherein the conversion process and an inverse conversion process include at least one of cropping, reduction, enlargement, rotation, inversion, pixel movement, and pixel value conversion.

6. The reproduction device according to claim 1, wherein the circuitry further configured to convert the first and the second decoded data such that the pixel positions of the first and the second decoded data are identical to each other to generate the reproduction image data in which intermediate values of pixel values of respective pixels included in the first and the second decoded data each having been converted so as to have identical pixel positions each other are set to pixel values of respective pixels after synthesis.

7. A reproduction method comprising:
acquiring transmission information including first and second coded data generated by encoding first and second image data respectively, at least one of the first and the second image data is lossy encoded, the first and the second image data being generated by performing conversion processes different from each other on original image data;
decoding the first and the second coded data to generate first and second decoded data; and
converting the first and the second decoded data so that the pixel positions of the first and the second decoded data are identical to each other to generate reproduction image data, wherein
weighted average values or weighted intermediate values of pixel values obtained by weighting, using a weighting coefficient, respective pixels included in the first and the second decoded data each having been converted to have identical pixel positions to each other are set to pixel values of respective pixels after synthesis, and
the weighting coefficient is a value in accordance with a ratio of an inverse of a square of a standard deviation of an encoding distortion of the first coded data and a square of a standard deviation of an encoding distortion of the second coded data, wherein the standard deviation is calculated based on image size and the pixel positions in horizontal and perpendicular directions.

* * * * *